(12) United States Patent
Koseki et al.

(10) Patent No.: US 6,734,944 B1
(45) Date of Patent: May 11, 2004

(54) LIQUID CRYSTAL DISPLAY

(75) Inventors: Toshihiko Koseki, Himeji (JP);
Hidefumi Yamashita, Yamato (JP);
Taro Hasumi, Tokyo (JP); Yuichi Momoi, Kamahura (JP); Yoshinori Shohmitsu, Yamato (JP); Tomohito Johnai, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,819

(22) Filed: Apr. 26, 2000

(30) Foreign Application Priority Data

Apr. 28, 1999 (JP) .......................................... 11-122923

(51) Int. Cl.[7] .......................................... G02F 1/1345
(52) U.S. Cl. .................................. 349/155; 349/156
(58) Field of Search ................................. 349/155, 156, 349/157; 428/1.5

(56) References Cited

U.S. PATENT DOCUMENTS

| | | | | |
|---|---|---|---|---|
| 5,499,128 A | * | 3/1996 | Hasegawa et al. | 349/155 |
| 5,978,061 A | * | 11/1999 | Miyazaki et al. | 349/155 |
| 6,094,251 A | * | 7/2000 | Jones et al. | 349/172 |
| 6,181,406 B1 | * | 1/2001 | Morimoto et al. | 349/155 |
| 6,288,121 B1 | * | 9/2001 | Bader et al. | 514/605 |
| 6,304,308 B1 | * | 10/2001 | Saito et al. | 349/155 |
| 6,337,730 B1 | * | 1/2002 | Ozaki et al. | 349/156 |

* cited by examiner

*Primary Examiner*—Kenneth Parker
(74) *Attorney, Agent, or Firm*—Robert M. Trepp; Anne V. Dougherty

(57) ABSTRACT

In the liquid crystal display 10, consisting of a first substrate (12) and a second substrate (14) facing each other, either or both of the first substrate (12) and the second substrate (14) is/are disposed in a non-display region, the spacers 18 consisting of a photosensitive resin regulating the cell gaps 16 between both substrates 12 and 14, and liquid crystal 20 sandwiched between the first substrate (12) and the second substrate (14), either a dynamic hardness value or a plastic deformation hardness value is within a fixed range.

4 Claims, 2 Drawing Sheets

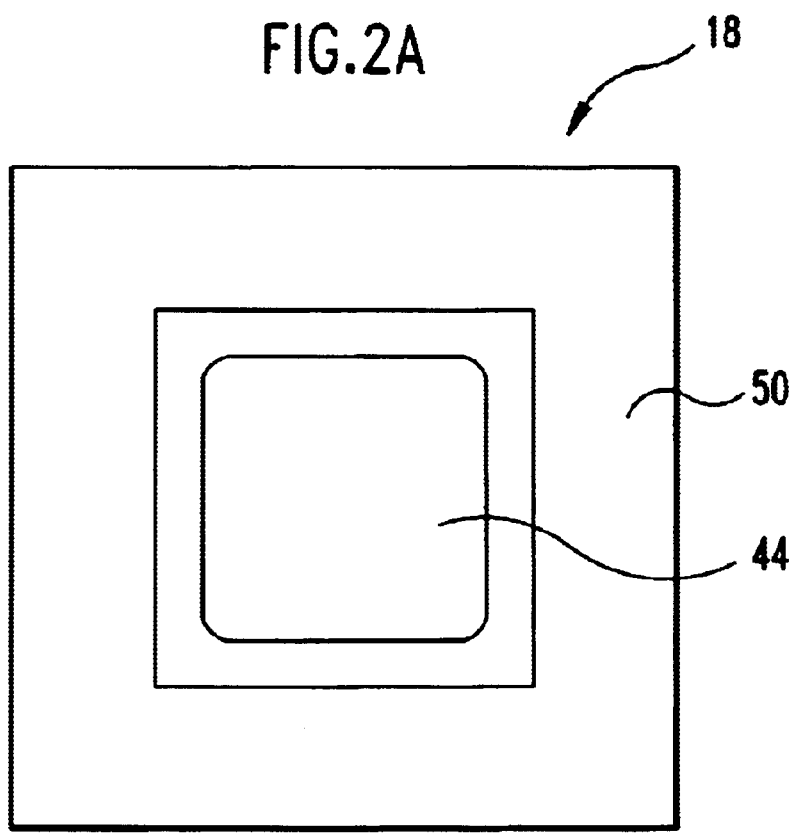
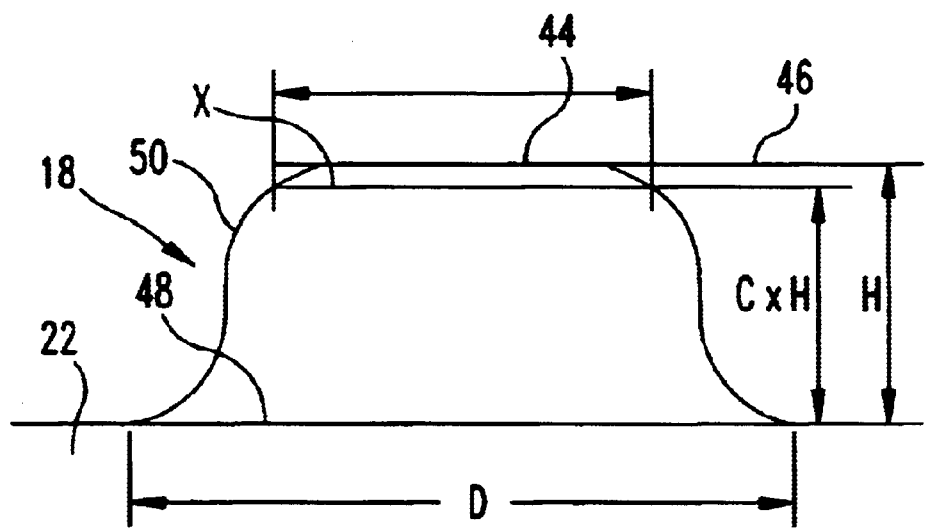

LIQUID CRYSTAL DISPLAY

FIELD OF THE INVENTION

The present invention relates to a liquid crystal display, and more specifically, to a spacer for a liquid crystal display.

BACKGROUND OF THE INVENTION

A liquid crystal cell of a liquid crystal display is formed by sealing a liquid crystal between 2 substrates. The thickness of this sealed liquid crystal layer, that is, a space between the substrates, is called a cell gap. Display unevenness is caused by partial thickness differentials of the liquid crystal layer when cell gaps are not uniform. Accordingly, spherical spacers called pearl spacers and the like or cylindrical spacers are used for providing uniform cell gaps between the substrates.

Since spacers are not fixed to substrates, but they are dispersed between two substrates, variations in the distribution (density) of spacers may result. As a result, small cell gaps where the spacers are less densely distributed may cause display unevenness. Further, it is not desirable that screen flickering can be observed when watching liquid crystal cells on a large screen on the whole. Furthermore, although these spacers are invisible, they cause a problem that the spacers are in shadow when they are on the surface of the pixels, for example, in a case where the pixels represent black, and a black contrast sharply deteriorates due to the appearance of the spacers as white dots on the screen.

Therefore, various techniques for forming pillar-like spacers in predetermined positions by using a photosensitive resin have been suggested to improve the conventional method for manufacturing a liquid crystal display with spherical spacers dispersed. However, all of these techniques have some problems and none of them has been actually used.

For example, the Japanese Laid-Open Patent Publication No. 54-12066 discloses a method for regulating a cell gap by scattering lots of first spacers formed of materials having a high melting point and by adding second spacer portions formed of materials having a relatively low melting point on the first spacers to fuse the second spacer portions with opposing panels. In this method, two kinds of spacers made of different materials are used, and each of them serves as a spacer and an adhesive to the opposing panel as well, but this method requires double deposition, which has turned out to be no good from both aspects of the cost and the productivity.

Further, the Japanese Laid-Open Patent Publication No. 60-164723 discloses a method for providing cell gaps by forming pillars made of electrical insulator on a liquid crystal driving element. Furthermore, the Japanese Laid-Open Patent Publication No. 56-25777 discloses a method for forming a cell gap by providing a spacer function to a portion where a semiconductor is provided. Since these methods are for further forming pillars on a thin film transistor (TFT) having protrusions on it or the like, the level differences of a foundation and positioning accuracy, which exerts an effect on the formation of gaps, made it difficult to form uniform cell gaps.

Further, the Japanese Laid-Open Patent Publication No. 56-38008 discloses a method for forming cell gaps by providing a plurality of spacer materials on an image non-display portion of pixels, which are thicker than semiconductor driving elements. The spacer materials disclosed in this patent publication are highly hard inorganic matters such as metallic oxide, and in addition, a plurality of spacers per pixel are arranged in a liquid crystal display. For this reason, especially, in the case of a cell of 10 inches or more, the spacer having too high strength on the whole causes low-temperature bubbles. Specifically, when a liquid crystal display manufactured at room temperature is cooled down to an extreme low temperature during transportation or the like, cavities (vacuum babble) are created inside the cell gaps because spacers in cell gaps do not shrink, even if the liquid crystals shrink. Because of this problem, this display cell is not suitable for a practical use.

Moreover, the Japanese Laid-Open Patent Publication No. 7-281195 discloses that about 5 μm-cell gaps are achieved by forming 2 to 3 μm of plural multi-layered second protrusion parts on the side of the color filter substrate (CF), forming 2 to 3 μm of plural first protrusion parts on the side of an array substrate by using a pigment dispersion resist, and then superimposing one substrate on another with their protrusions facing each other. In this method, desired cell gaps can be obtained according to the height of the protrusion parts of both array and CF-type substrates. However, the optical density gets higher because the first protrusion parts on the array substrate side also serve as a black matrix (BM). When a photosensitive pigment dispersion resin is used, there is an upper limit of height due to the use of a photo process. On the other hand, since the color filter of the CF laminate on the CF substrate side gets thinner, the second protrusion parts of the CF substrate side have an upper limit to their film thickness and there is also a limit to uniformity of heights obtained by the laminate.

An object of the present invention is to solve problems of unstable positioning of spherical spacers, etc. Another object of the present invention is to provide a liquid crystal display which can inhibit the generation of low-temperature bubbles and serve as a spacer formed of photosensitive resin materials which are resistive to local load.

SUMMARY OF THE INVENTION

As a result of intensive studies to achieve these objects, the inventors have attained this invention. In the liquid crystal display according to the present invention, since spacers, which regulate cell gaps between the first and the second substrates facing each other, are formed on a predetermined position except a non-display region, or a pixel surface by using photosensitive resin, the spacers do not get behind the pixels. As a result, especially a black contrast can be improved. In addition, since a density of the spacers is substantially constant, uniform cell gaps can be provided, so that unevenness and flickering of the liquid crystal screen from both microcosmic and macrocosmic points of view. In the liquid crystal display of the present invention, characteristics and forms of spacers are set within a predetermined range. Therefore, spacers are shrinked when the liquid crystal display is cooled to a low temperature to shrink liquid crystals and then both substrates are bent convexly in an inward direction, so that no vacuum portions or low temperature bubbles are generated inside the cell gaps. Spacers can be elastically deformed when the liquid crystal screen is locally pressed by a finger or the like, and plastic deformation appears on the spacers when the liquid crystal screen is further strongly pressed. However, in the liquid crystal display of the present invention, the dimensions of the spacers can return to approximately original dimensions and the spaces between the cell gaps in the pressed portion can recover to constant spaces by preventing the spacer from being easily crashed by the pushing pressure and minimizing the residual distortion in plastic hysteresis when the pressing force is released.

BRIEF DESCRIPTION OF THE DRAWINGS

Now, a preferred embodiment of the liquid crystal display according to this invention will be described in detail on the basis of accompanying drawings wherein:

FIGS. 2A and 2B are a plan view and a cross sectional side view respectively illustrating an evaluation method for spacers formed in the liquid crystal display according to the present invention.

DETAILED DESCRIPTION OF THE INVENTION

Figure 1:
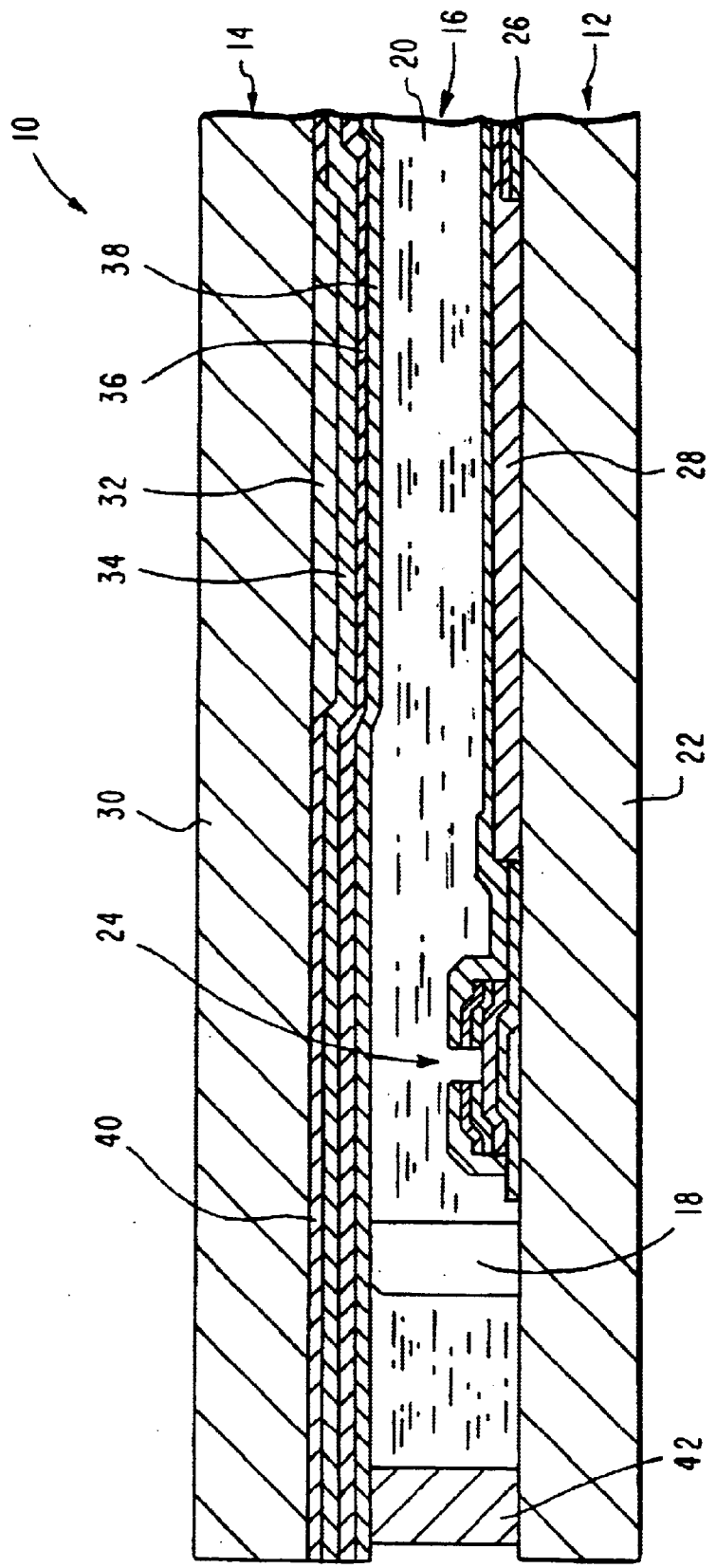
FIG. 1 is an enlarged sectional view of a main part for illustrating an embodiment of the liquid crystal display according to the present invention.

As shown in FIG. 1, a liquid crystal display 10 is formed from a matrix comprises at least an array substrate 12 and a color filter substrate 14 disposed facing each other, spacers 18 formed of photosensitive resin which regulates cell gaps 16 between the array substrate 12 and the color filter substrate 14, and a liquid crystal 20 sandwiched between both substrates 12 and 14. The array substrate 12 and the color filter substrate 14 may have well known structures and may be formed by a well known manufacturing method. A well known liquid crystal 20 can be used.

For example, in the array substrate 12, a TFT (thin film transistor) 24, a storage capacity 26, and pixel electrodes (display electrodes) 28 are arranged in a matrix form on a translucent substrate 22. On the other hand, the color filter substrate 14 is equipped with a color filter 32 whose primary colored portions are arranged on a translucent substrate 30 in the matrix form, a common electrode 36 and an alignment layer 38 where a protective coating layer 34 is above them. This color filter 14 can be equipped with a black matrix 40 which can increase shielding between colored portions (pixels) and improving contrast, if necessary.

Pillar-like spacers 18 are formed of photosensitive resin on the array substrate 12 formed by a publicly known manufacturing method. The pillar-like spacers 18 are formed in a non-display region which does not exert an influence on pixels and does not include at least the surface of the pixel electrodes 28, for example, such as on the gate electrode line or the source electrode line, and the like. Although the spacers 18 are preferably formed on a passivation layer consisting of SiNx and the like, which is formed on the area except the pixel electrodes of the array substrate 12, the passivation layer is not necessarily used as the foundation of the spacers 18 in consideration of a relation with resin employed for forming the spacers 18. The sign 42 represents a seal for sealing the crystal liquid 20 in the cell gaps 16.

As material for forming the spacers 18, photosensitive resin is employed and more preferably photosensitive resin that satisfies the following conditions is employed. Namely, a photosensitive resin for forming the spacers 18, whose dynamic hardness value (DH) is between 26 and 30 evaluated by the following formula, is selectively used:

$DH = K \times Pmax/hmax^2$

DH: dynamic hardness value (Kgf/mm$^2$)

Pmax: maximum load (Kgf)

hmax: total maximum variation (mm) obtained by adding elastic deformation and plastic deformation wherein a constant K represents a value obtained by the variation of an indentator inherent to the liquid crystal display. This formula is derived by conducting a dynamic hardness test. Dynamic hardness used herein means hardness obtained when the load is sequentially varied to be extrapolated to a zero load and parameter means a target load. This dynamic hardness represents a function of depth to the hardness because this dynamic hardness varies the load sequentially.

The spacers 18, whose dynamic hardness value (DH) is in the range from 26 to 30, is neither hard nor soft. When the dynamic hardness value (DH) is below 26, there is a wide variation in the cell gaps after the force is applied from the outside of the liquid crystal display and this causes a problem that image quality is easily changed. Further, when the dynamic hardness value (DH) exceeds 30, undesired low-temperature bubbles are generated in the liquid crystal when the liquid crystal display is cooled down to a low temperature.

Also, the spacers 18 are preferably formed of photosensitive resin, which satisfies the following conditions: more specifically, photosensitive resin for forming the spacers 18, whose plastic deformation hardness value (HV) is between 38 and 46 obtained by the following formula, is selectively used:

$HV = K \times Pmax/hr^2$

HV: plastic deformation hardness (Kgf/mm$^2$)

Pmax: maximum load (Kgf)

hr: variation (mm) when the tangent in the maximum variation point of a curb has no load in the case of unloading.

wherein a constant K represents a value obtained by the variation of an indentator inherent to the liquid crystal display.

Further, this formula determines a tangent in the maximum different point (same as the maximum different point in loading) of the curve when unloading and the hardness corresponding to Vickers' hardness by separating the plastic variation from its inclination. More specifically, this is led by the plastic hysterisis curve obtained by a compression variation measurement against the load. This plastic deformation hardness value (HV) may be a little different from actual Vickers' value due to the shape of the indentator or the like.

The plastic deformation hardness value (HV) of the spacers 18 are preferably in the range from 38 to 46. When their plastic deformation hardness value (HV) is below 38, permanent image quality defects occur because the dimensions of the spacers cannot return to the dimensions before deformation due to large plastic deformation variation caused by the small cell gaps when the external force is applied to the liquid crystal display. When the plastic deformation hardness value (HV) exceeds 46, undesired low-temperature bubbles can be generated.

If the spacers 18 meet either of the conditions of hardness value (DH) or plastic deformation hardness value (HV) evaluated by the above formula, certain effects can be obtained, but it is desirable to meet both conditions.

Since the spacers 18 are disposed in the nondisplay region on the array substrate 12, it does not affect the image quality, however, when the spacers 18 are few in number, namely, when the total lower bottom area of the pillar-like spacers 18 is small, it is difficult to keep the cell gaps 16 nearly constant due to weak bearing capacity of the color filter substrate 14. In addition, when a local load is imposed on the color filter substrate 14, the spacers 18 can be easily broken. On the contrary, when the spacers 18 are large in number, the strong bearing capacity of the color filter substrate 14 allows the cell gaps 16 to keep constant, and therefore, the spacers 18 can sufficiently carry the local load imposed on the color filter substrate 14, however, when the liquid crystal 20 shrinks by exposing the liquid crystal display 10 to a low temperature, a vacuum portion (low-temperature bubbles) is generated. Therefore, it is important that the number of the spacers 18 is appropriate for the array substrate 12 or the color filter substrate 14, namely, appropriate area, the occupancy ratio of the spacers 18 in the substrate is important.

Where the occupancy ratio (column occupancy ratio) is defined as the ratio of the pixel area that is made up by the lower bottom area of the column (spacers 18) constituting the cell gaps 16 forms against the pixel area, the column occupancy ratio is expressed as follows:

Column occupancy ratio=(Lower bottom area of column×column density/pixel area)×100 wherein column density means the number of the columns constituting the cell gaps per pixel can be represented by the following formula:

Column density=total number of columns/total number of pixels

When the study results of the inventors of the present invention show that the column occupancy ratio expressed by the above formula ranges from 0.05 to 0.86%, the pillar-like spacers 18 can sufficiently carry the local load without being crushed. Further, even if it is exposed to a low temperature, no low-temperature bubbles are generated inside the cell gaps 16 because the spacers 18 contract in response to a negative pressure generated in the cell gaps 16 as the liquid crystal contracts.

When the surface that is parallel to the pillar-like spacers 18 is rectangular in shape, the ratio of one side of the upper bottom of the spacers 18 to one side of the lower bottom is between 50 and 90%. Alternatively, when the surface is circular in shape, the ratio of the diameter of the upper bottom of the spacers 18 to that of the lower bottom is preferably between 50 and 90%. When the ratio of two sides of the spacers 18 or the ratio of the diameters is within the range of 50 to 90% as described above, the following troubles and problems can be minimized. However, if the ratio of two sides of the spacers 18 or the ratio of the diameters is below 50%, the numerical aperture in the liquid crystal display sharply drops. If the ratio of two sides of the spacers or the ratio of the diameters exceeds 90%, the columns tend to be tapered in the opposite direction in the process of forming the columns, which leads to collapse of the columns in the subsequent processes for forming cell gaps.

The spacers 18 are formed in the shape of prism or cylinder by a photolithography method and then they are heat treated. However, since side-wall portions of the spacers 18 are not linearly etched, they are distorted as shown in FIG. 2(*b*). Especially, an upper bottom portion 44 is a little curbed, and each measured value varies every time the length or the diameter of one side of the upper bottom 44 is measured, or when measurement is carried out by different people, and thus the measured value is unstable. On the other hand, a tangent line 46 which is tangent to the upper bottom 44 can be drawn or the highest position of the upper bottom 44. The position of the tangent line 46 is stable and no difference is caused by different measurers.

Measuring method is as follows: first, the tangent line 46 is drawn on the upper bottom 44 of the spacers 18 by using an enlarged cross-sectional photo of the spacers and then the length D of one side of a lower bottom 48 in the same direction as the tangent line 46 is measured. Next, the spacing (height) H between the lower bottom 48 (substrate 22) of the spacers 18 and the tangent line 46 of the upper bottom 44 is measured. The dimensions obtained by multiplying this height H by certain constant C below 1 such as 0.9 is defined as the height of the upper bottom (C×H). A line X parallel to the substrate 22 is drawn on that position, and the spacing between the two points of intersection of the line X and an outline 50 of the spacers 18 (side surface) is defined as the dimensions of the upper bottom. Etching is controlled, so that the ratio of the length of the upper bottom to that of the lower bottom obtained in this manner can be in the range of 50 to 90%. The ratio of the length of the upper bottom to that of the lower bottom varies according to the value of the constant C multiplying the height H of the upper bottom. The above range of 50 to 90% is the value to be obtained when the constant C is set at 0.9.

Next, the elastic coefficient of the spacers 18 in the liquid crystal display according to the present invention is preferably within the range from 100 to 500 Kg/mm$^2$. When the elastic coefficient is within this range, the spacers 18 are not easily broken due to the local load. Even when the spacing of the cell gaps 16 shrinks due to the shrinkage of the crystal liquid 20 caused by a fall of the temperature, and compression force is applied to the spacers 18, no low-temperature bubbles are generated because the spacers sufficiently shrink.

Furthermore, the linear expansion coefficient of the spacers 18 in the liquid crystal display 10 according to the present invention is preferred to be nearly equal to the volume expansion coefficient per unit area. The liquid crystal display 10 is exposed to various temperatures depending on work environments or during transportation. The temperature ranges 40° C. to −20° C. Accordingly, if the linear expansion coefficient of the spacers 18 is far larger than that of the volume expansion of the liquid crystal 20 per unit area, the expansion of the spacers 18 may cause a vacuum space inside the cell gaps 16 when the liquid crystal display 10 is exposed to a high temperature. On the contrary, if the linear expansion coefficient of the spacers 18 is far smaller than that of the volume expansion of the liquid crystal 20 per unit area, the shrinkage of the liquid crystal may cause low-temperature bubbles because the liquid crystal 20 is more shrinkable than the spacers 18 when the liquid crystal display 10 is exposed to a low temperature. For this reason, the linear expansion coefficient of the spacers 18 is preferred to be nearly equal to that of the volume expansion of the liquid crystal 20 per unit area or be an approximate value to the volume expansion coefficient.

The spacers 18 having various properties have thus been described above, however, it is sufficient that the properties of the spacer applied to the liquid crystal display according to the present invention meet at least one of the requirements. The spacer which meets two or more requirements is most desirable. A JNPC-43 (manufactured by JSR) can be taken as an example of a photosensitive resin meeting these requirements, but spacers are not limited to them. The target properties may be obtained by controlling baking conditions of the photosensitive resin.

Further, when the target properties of spacers are not obtained by single photosensitive resin, various filling materials can be mixed with the photosensitive resin to obtain the properties. It is desirable that the photosensitive resin is colored a suitable color, such as black, etc. Furthermore, the shape of the surface parallel to the substrate of the spacers formed by a photosensitive resin can be circle, oval figure, ellipse, square, rectangle, triangle, or other polygons and so on, but it is not especially limited.

The spacers are preferred to be formed on either of the array substrate or the color filter substrate, which is not especially limited. The spacers may be formed on both the array and the color filter substrates, which is not limited at all.

Furthermore, spacers can be formed on an alignment layer or the alignment layer can be formed over the spacers. Thus, any and all modifications, variations or equivalent arrangements can be made to the embodiments on the basis of knowledge of those skilled in the art without departing from the scope of the invention.

An array substrate was prepared by using a glass substrate in accordance with a conventional manufacturing method. To form pillar-like spacers on this array substrate, a passivation layer made of SiNx is formed as a foundation except pixel electrodes. JNPC-43 (produced by JSR), as a photosensitive resin layer, was evenly applied to the passivation layer to form a film having a thickness of 5.5 $\mu$m and prebaked at 120° C. for 3 minutes.

Next, a photomask, which is so set that spacers have the column occupancy ratio of 0.19% and are arranged in a non-display region, and a light source without filter (broad band) were employed to expose the prebaked substrate to light with 300 mJ of energy. Using a 0.2% TMAH aqueous solution (manufactured by Tokyo Ohka Kogyo) as a developer, development was conducted at room temperature for 60 seconds. After that, baking was carried out at 230° C. for 20 minutes to form spacers.

The physical value of the spacer obtained was checked by using a thin layer hardness tester (produced by Elionix) ENT-1100. As a result, its dynamic hardness value DH was 28 and its plastic deformation hardness value HV was 44.

The array substrate, on which spacers are formed, and a color filter substrate separately formed in accordance with a conventional process were employed to constitute a liquid crystal display in the process eliminating the distribution process of ball-like spacers from the conventional process. A local load and low temperature bubbles of the obtained liquid crystal display were evaluated.

The evaluation of the local load is as follows: firstly, a cell gap on a measuring point is measured and the obtained value is defined as the cell gap initial value. Secondly, a metal ball having a diameter of 3 mm is placed on the surface of the color filter substrate on the measuring point, and then the cell gap on the measuring point is measured after applying specific load (10 Kgf) to the metal ball. The difference between the measured value and the initial value is defined as the "crushed size". The results of the measurements are shown in Table 1.

To evaluate low-temperature foaming, the liquid crystal display device manufactured at a room temperature was left in the environment at −20° C. and it was observed whether or not vacuum bubbles were generated. The results of the observation are shown in Table 1.

TABLE 1

|  | Local load Crushed size (m) | Vacuum bubbles in Low-temperature foaming |
|---|---|---|
| Example | 0.17 | None |
| Comparative Example | 0.27 | None |

Comparative Example

As a comparative example, conventional ball-like spacers were sprayed on identical array and color filter substrates used for an example to prepare a liquid crystal display. Local load and low-temperature foaming of the obtained liquid crystal display of conventional structure was evaluated in the same manner as the Example. The results of the evaluation are shown in Table 1.

As a result of evaluation made by comparing the Example and the Comparative Example, it was confirmed the liquid crystal display according to the Example had the same performance as or a more excellent performance than the liquid crystal display manufactured using ball-like spacers.

The spacers of the liquid crystal display according to the present invention are not only formed on a predetermined portion by a photosensitive resin, but also have physical value or form, such as predetermined hardness value and plastic deformation hardness value, etc. Therefore, the spacers return to the previous state without being destroyed due to local load, so that the cell gaps can be kept nearly constant. Even if the liquid crystal display is exposed to a low temperature, neither vacuum portions inside the cell gaps nor low-temperature bubbles will be generated because the spacers get shrinked by external pressure or the like as the liquid crystal inside the cell gaps shrink.

Having thus described the invention, what is claimed is:

1. A liquid crystal display comprising:

first and second substrates each having a display and a non-display region and being disposed to face each other;

a plurality of columns each comprising a spacer disposed in the non-display region of at least one of the first and the second substrates and being formed of photosensitive resin which regulates a cell gap between the first and the second substrates; and liquid crystal sandwiched between the first and the second substrates, wherein each of said spacers has a dynamic hardness value (DH) from 26 to 30, which is obtained by the following formula:

$$DH = K \times P\mathrm{max}/h\mathrm{max}^2,$$

wherein DH is dynamic hardness, K is a constant value assigned to the indentator used to test the liquid crystal display, Pmax is maximum load, and hmax is the total maximum variation obtained by adding the measured elastic deformation and plastic deformation under load, and wherein each of said spacers has a hardness value of plastic deformation (HV) from 38 to 46, which is obtained by the following formula:

$$HV = K \times P\mathrm{max}/hr^2,$$

wherein HV is hardness of plastic deformation, K is a constant value assigned to the indentator used to test the liquid crystal display, Pmax is maximum load, and hr is measured variation when the tangent in the maximum variation point of a curb has no load in the case of unloading.

2. The liquid crystals according to claim 1 wherein for a rectangular spacer, the length of one side of the upper spacer surface is 50 to 90% smaller than the length of one side of the lower spacer surface and wherein for a circular spacer, the diameter of the upper spacer surface is 50 to 90% smaller than the diameter of the lower spacer surface.

3. The liquid crystal display according to claim 1 wherein said plurality of columns have column occupancy ratio from 0.05 to 0.86%, which is expressed as follows:

Column occupancy ratio=(Lower bottom area of column×column Density/pixel)×100

Column density: Total number of columns/total number of pixels.

4. A method for providing a liquid crystal display comprising the steps of:

disposing a first and second substrate facing each other, said first and second substrates having a display and a non-display region;

selecting a photosensitive resin to regulate a cell gap between the first and the second substrate;

wherein said selecting of a photosensitive resin comprises choosing a photosensitive resin based on at least one of the group consisting of:

(a) a dynamic hardness value from 26 to 30, which is obtained by the following formula:

$$DH = K \times P\mathrm{max}/h\mathrm{max}^2,$$

wherein DH is dynamic hardness, K is a constant value assigned to the indentator used to test the liquid crystal display, Pmax is maximum load, and hmax is the total maximum variation obtained by adding the measured elastic deformation and plastic deformation under load;

(b) a hardness value of plastic deformation (HV) from 38 to 46, which is obtained by the following formula:

$$HV = K \times P\mathrm{max}/hr^2,$$

wherein HV is hardness of plastic deformation, K is a constant value assigned to the indentator used to test the liquid crystal display, Pmax is maximum load, and hr is measured variation when the tangent in the maximum variation point of a curb has no load in the case of unloading;

(c) an elastic coefficient from 100 to 500 kg/mm$^2$; a linear expansion coefficient which is nearly equal to the coefficient of volume expansion per unit area of the liquid crystal;

(d) wherein for rectangular spacers, the length of one side of the upper spacer surface is 50 to 90% smaller than the length of one side of the lower spacer surface and wherein for circular spacers, the diameter of the upper spacer surface is 50 to 90% smaller than the diameter of the lower spacer surface; and (e) a column occupancy ratio from 0.05 to 0.86%, which is expressed as follows:

Column occupancy ratio=(Lower bottom area of column×column density/pixel area)×100

Column density: Total number of columns/total number of pixels;

placing spacers comprising said photosensitive resin between the first and second substrates, said spacers being placed in the non-display region of at least one of the first and the second substrates; and providing liquid crystal between the first and the second substrates.

* * * * *